United States Patent [19]

Kitamura et al.

[11] 4,342,108
[45] Jul. 27, 1982

[54] VARIABLE SPEED TONE ARM CONTROL SYSTEM

[75] Inventors: Masatsugu Kitamura; Tsuyoshi Ono; Hideo Onoye, all of Yokohama, Japan

[73] Assignee: Victor Company of Japan, Limited, Yokohama, Japan

[21] Appl. No.: 193,812

[22] Filed: Oct. 3, 1980

[30] Foreign Application Priority Data

Oct. 6, 1979 [JP] Japan ................................ 54-129176

[51] Int. Cl.³ .............................................. G11B 3/08
[52] U.S. Cl. ...................................... 369/216; 369/41; 369/221; 369/215; 369/230
[58] Field of Search ................... 369/33, 41, 215, 221, 369/230, 225, 226, 228, 216, 224

[56] References Cited

U.S. PATENT DOCUMENTS

| | | | |
|---|---|---|---|
| 3,573,809 | 4/1971 | Magnien | 369/41 |
| 4,184,687 | 1/1980 | Wren et al. | 369/33 |
| 4,202,549 | 5/1980 | Takeuchi | 369/41 |
| 4,262,912 | 4/1981 | Nakai | 369/41 |
| 4,266,783 | 5/1981 | Milutzki et al. | 369/41 |

FOREIGN PATENT DOCUMENTS 2759545 5/1980 Fed. Rep. of Germany .

*Primary Examiner*—John W. Shepperd
*Attorney, Agent, or Firm*—Lowe, King, Price & Becker

[57] ABSTRACT

A tone arm control system includes first and second manually operated keys for providing input signals to a control circuit. The control circuit detects which one of the keys is operated and drives a vertical motor in the tone-arm upward direction and subsequently drives a horizontal motor in a tone-arm horizontal direction depending on which one of the keys is detected as being operated. The control circuit includes a counter which starts counting clock pulses to detect when a predetermined count is reached. During the predetermined count period the horizontal motor is energized at a low voltage to move the tone arm at a relatively low speed. When the clock count exceeds the predetermined value the speed of the tone arm is increased to allow it to speedily approach a desired position located relatively remote from the tone arm.

11 Claims, 2 Drawing Figures

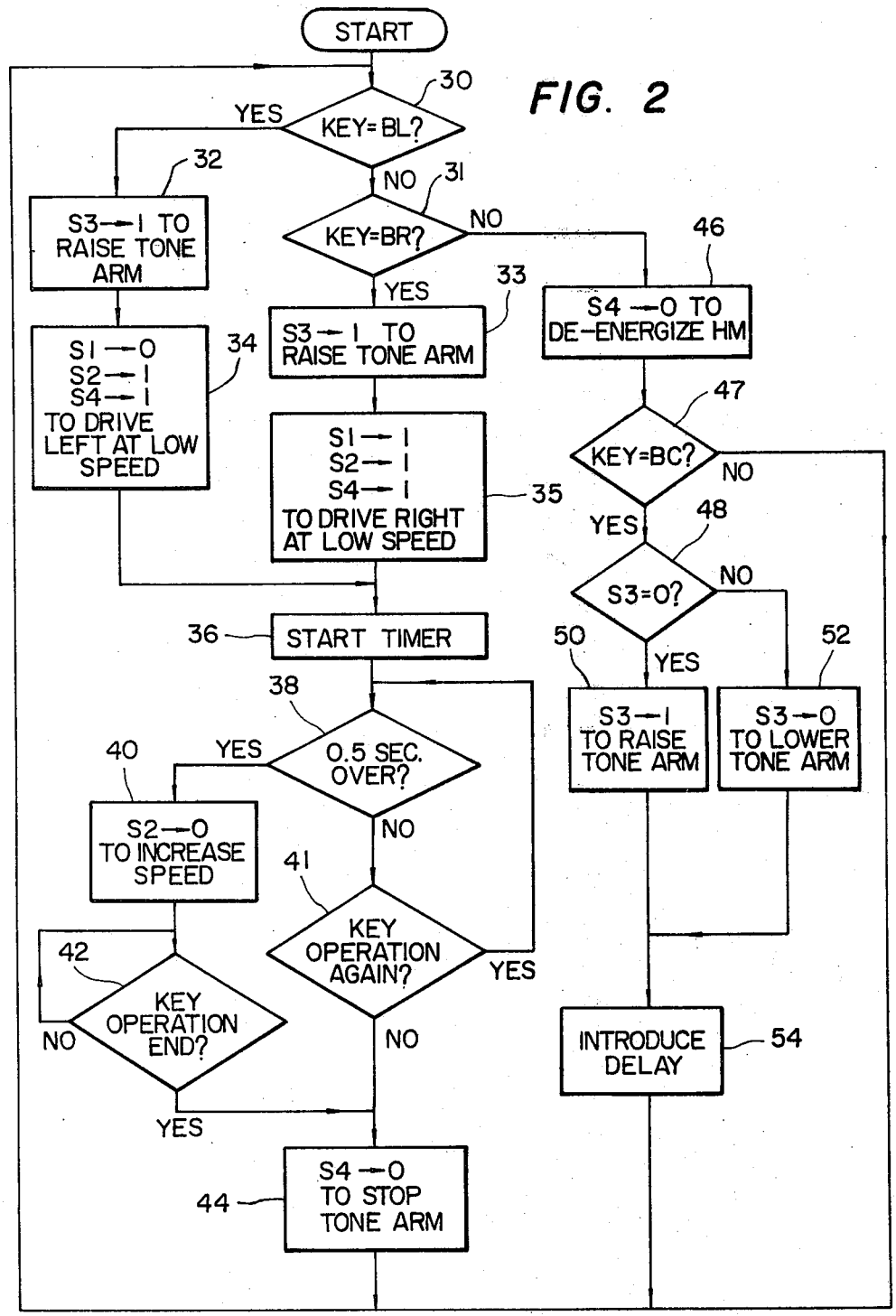

VARIABLE SPEED TONE ARM CONTROL SYSTEM

BACKGROUND OF THE INVENTION

The present invention relates to tone arm control systems for record disk players, and particularly to a variable speed tone arm control system which drives the tone arm at variable speeds as a function of distance to a desired record track.

Tone arms of the manually operated, pivotally movable type require the exercise of great care when handling the tone arm to prevent the record surface from being scratched with the sharp edge of the pickup stylus. For this reason, key-operated tone arm control systems have hitherto been developed, whereby the tone arm is driven by a power source when a particular function key is operated. Laterally driven type tone arms have been developed using the key-operated drive system because of their excellent tracking performance as compared with the pivotally driven type. In such conventional key-operated drive system, the tone arm is driven at a preset constant speed. If the preset speed is relatively low and the desired track is remotely located from the tone arm, the time necessary to reach that track is substantial. On the other hand, if the preset speed is relatively high, the tone arm tends to overrun the intended position under its own momentum, resulting in a difficulty in achieving accurate positioning.

SUMMARY OF THE INVENTION

The present invention provides an improved tone arm control system in which the horizontal speed of the tone arm is rendered variable in accordance with the operating state of a function key.

Specifically, first and second keys are provided which are operated exclusively of each other in response to operator action. A control circuit, preferably a microcomputer, detects operation of one of the keys to move the tone arm upward regardless of which one of the keys is operated and subsequently to move the tone arm in a horizontal direction specified according to the result of the key function detection. In accordance with the invention, the control circuit initially sets a relatively low speed for the tone arm which speed prevails for a predetermined interval, and immediately following the termination of this interval the control circuit resets the speed to a relatively high value. Thus, the tone arm is allowed to move in a specified horizontal direction at a low speed within a short range to achieve precision positioning of the pickup stylus on a desired record track if this track is located in that range. If the desired track is located outside this range, the speed is increased to quickly shift the tone arm toward that track. If the tone arm overran or stopped short of the desired track, the operator makes a further attempt in which the tone arm is shifted at low speed to permit precision positioning.

Preferably, a third manual key is provided for moving the tone arm to a vertical position opposite to the position in which the tone arm is located at the moment the third key is operated. The control circuit detects the vertical position of tone arm relative to the surface of record disk and vertically moves the tone arm in a direction determined by the detected arm position. When the tone arm has been shifted to desired horizontal position, the third key is operated to lower the tone arm to restart playing operation. The third key may also be used independently of the other keys to stop playing the record at a desired position.

BRIEF DESCRIPTION OF THE DRAWINGS

The invention will be further described by way of example with reference to the accompanying drawings, in which:

FIG. 2 is an illustration of a flow chart associated with a microcomputer of FIG. 1.

DETAILED DESCRIPTION

Figure 1:
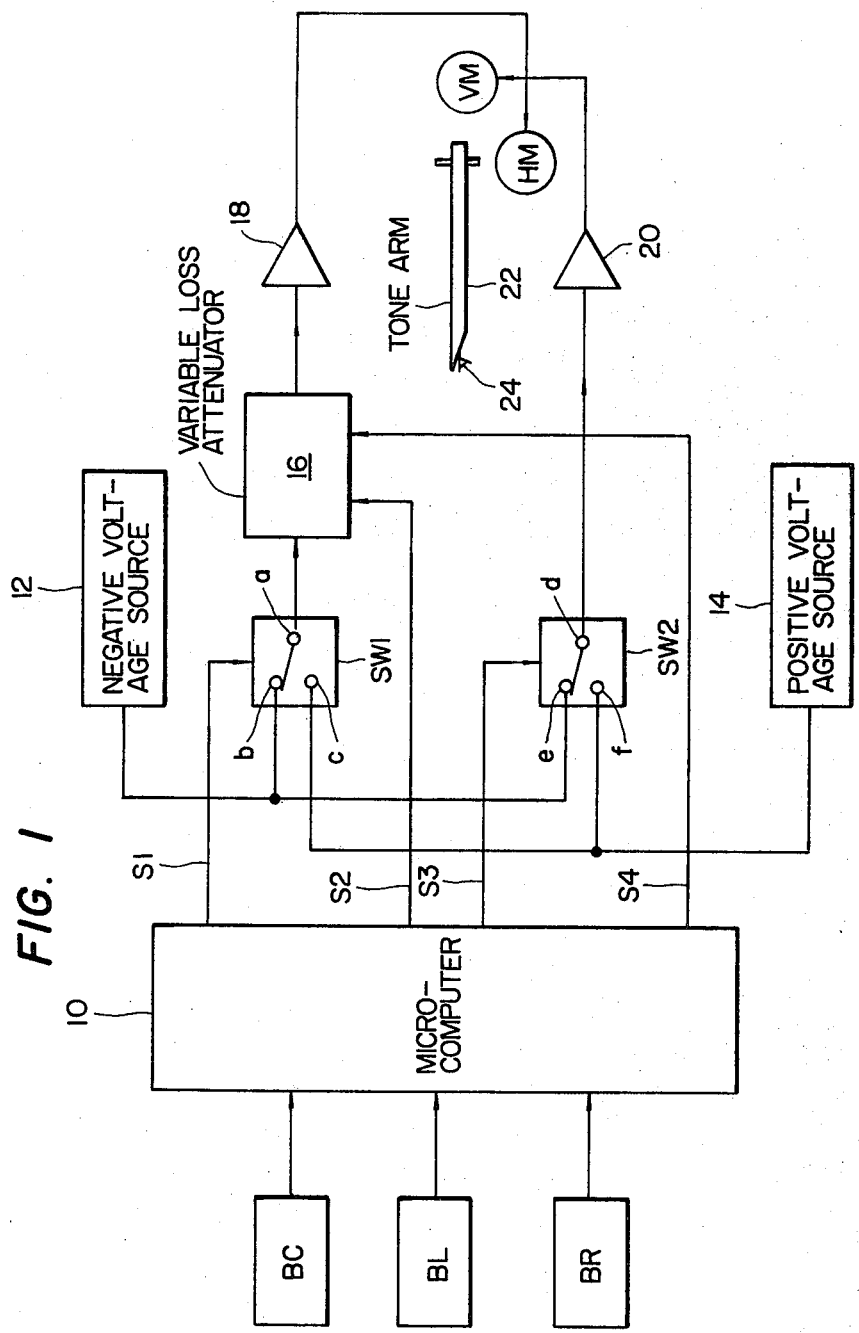
FIG. 1 is an illustration of a block diagram of the variable speed tone arm control system of the invention.

The tone arm control system according to the invention, represented in FIG. 1, comprises a microcomputer or any suitable control unit 10, manually-operated keys or buttons BC, BL, BR whose functions will be described later, negative and positive voltage sources 12, 14, a variable loss attenuator 16, and switches SW1, SW2. The microcomputer 10 receives tone arm control signals from the respective keys when operated and generates control signals S1, S2, S3 and S4. The switch SW1 receives signal S1 to selectively apply the negative or positive voltage from source 12 or 14 to variable loss attenuator 16 which modifies the input voltage in accordance with signals S2 and S4 and supplies the modified voltage through a linear DC amplifier 18 to a horizontal drive motor HM. This horizontal drive motor causes the tone arm 22 to advance horizontally in a direction depending on the polarity of the voltage supplied from the source 12 or 14 as determined by control signal S1. The speed of the tone arm is controlled by signals S2 and S4. Switch SW2 selectively applies the voltage sources to a vertical drive motor VM through a linear DC amplifier 20 to raise or lower the tone arm according to the polarity of the applied voltage.

More specifically, switch SW1 is designed to connect its moving contact arm a to a stationary contact b when signal S1 is at a logic one and switches it to a stationary contact c in response to a logical zero signal S1. Similarly, switch SW2 has its moving contact arm d switched to stationary contacts e or f when signal S3 is at logical one or zero, respectively. Tone arm 22 is moved rightward or leftward respectively in response to signal S1 having a logical one or zero, and moved upward or downward respectively in response to signal S3 having a logical one or zero.

Variable loss attenuator 16 imparts a variable amount of loss to applied input voltage in response to signals S2 and S4. When signal S4 is at logical zero, the attenuator increases its loss to infinity so that horizontal drive motor HM is de-energized to stop the horizontal movement of tone arm 22. When signal S4 is at logical one, the amount of loss is rendered variable in dependence on the logic state of signal S2. With signal S4 being at logical one, a logical zero value of signal S2 causes a decrease to occur in the amount of loss to increase the speed of tone arm movement, and a logical one value of signal S2 causes the attenuator to have a relatively high loss value to move the tone arm at a relatively low speed.

The microcomputer 10 is programmed in accordance with a flow chart shown in FIG. 2. The operation of the circuit of FIG. 1 will be fully understood from the following description with reference to FIG. 2.

The program shown in the flow chart starts when power is switched on. Manually operated keys BC, BL and BR are each of the non-locked type so that each operated key remains in an operative state as long as it is depressed by the user. Keys BL and BR have the functions of moving the tone arm to the left or right, respectively, and key BC is to move the tone arm in vertical directions depending on the vertical position of tone arm at the moment key BC is depressed. Key BC is used singly to lift the tone arm from the surface of a record disk during its play or lower it to restart playing immediately following the restoration of key BL or BR.

Assuming that the user desires to move tone arm 22 to the left, shift-to-left key BL is depressed until arm 22 reaches a desired position with respect to the record groove. This condition is detected by the computer 10 in a step 30. Control goes to a step 32 to set the logic state of signal S3 to "1". Tone arm 22 is raised to an upward position from the surface of the record disk to prevent it from being scratched by the stylus 24 of tone arm 22 when the latter is subsequently moved in a horizontal direction. Signals S1, S2 and S4 are reset to logical states "0", "1" and "1", respectively, in a step 34. Switch SW1 is switched to the c contact position to apply positive voltage to variable loss attenuator 16 to drive horizontal motor HM in the tone-arm leftward direction. Attenuator 16 imparts a relatively large amount of loss to the applied positive voltage so that tone arm 22 is driven leftward at a relatively low speed. A timer (not shown) is started in a step 36 to initiate counting clock pulses. If key BL remains operated for an interval greater than a predetermined value, typically 0.5 seconds, control goes through a step 38 to a step 40 in which signal S2 is reset to logical "0". This causes a decrease in loss to occur in attenuator 16 and increases the horizontal drive speed to a relatively high value. Thus, tone arm 22 is moved at a relatively low speed during the initial period of predetermined length and then at a relatively high speed thereafter in order for the tone arm to have access to a desired position in a short period of time. The end of key operation is detected in a step 42 and control proceeds to a step 44 wherein signal S4 is reset to a logical "0" state. Consequently, the attenuator loss increases to infinity reducing the current to motor HM to zero to stop the tone-arm leftward movement. Subsequently, control returns to the step 30 preparatory for subsequent operation of key BR or BC.

When key BR is operated, control follows steps 30 and 31 and proceeds to a step 33 in which the logical state of signal S3 is reset to "1" to raise tone arm 22 from the disk surface if the tone arm is previously in a lower position. If key BR is operated immediately following the restoration of key BL, tone arm 22 will remain in the raised position. Following the step 33 control proceeds to a step 35 where the logic states of signals S1, S2 and S3 are all reset to "1". The logical "1" signal S1 changes the polarity of voltage applied to attenuator 16 to thereby drive horizontal drive motor HM in the tone-arm rightward direction. Signals S2 and S4 cause attenuator 16 to give a relatively high attenuation to the negative voltage applied thereto, so that the tone arm is moved at a relatively low speed. Subsequently, steps 36 and 38 are executed. If the operation of the shift-to-right key BR terminates within the preset 0.5 seconds, control goes to a step 41. Provided that key BR is not operated again, tone arm 22 is stopped in the step 44. If key BR is repeatedly operated within the preset interval, steps 38 and 41 are repeatedly executed to continue advancement of tone arm 22.

Thus, in accordance with this invention, alternate operations of keys BL and BR at 0.5-second intervals permit tone arm 22 to reach the desired position at relatively low speed with a greater degree of precision than is possible with the prior art single speed drive system when the arm overruns that position. Furthermore, if tone arm 22 is stopped short of the distance from a desired position, repeated operations of the same key BL or BR at 0.5-second intervals permits tone arm 22 to advance at low speed until it precisely comes to the desired position.

When tone arm 22 is precisely located in a desired horizontal position, the user operates the key BC. In that event, control proceeds through steps 30 and 31 to a step 46 where signal S4 is reset to a logical "0" level to deenergize horizontal drive motor HM. Since tone arm 22 is assumed to have been in a raised position, execution of the step 46 has no influence on the tone arm position. Control subsequently goes to a step 47 to check to see if key BC is operated or not. A "yes" decision thus taken to a step 48 to check to see if the logic state of signal S3 is "0" or "1". If S3=0, the fact that vertical drive motor VM has been energized in the tone-arm downward direction is valid, and control advances to a step 50. If S3=1, the fact that motor VM has been energized in the tone-arm upward direction is valid, and a "no" decision route is taken to a step 52. In the step 50 the logic state of signal S3 is set to "1" to raise the tone arm and in the step 52, the logic state of signal S3 is set to "0" to lower the tone arm. Thus, after operation of key BR or BL, operation of key BC causes tone arm 22 to move to a downward position to bring the stylus into contact with the intended track.

If the user desires interruption of record playing, key BC is operated. In that event steps 30, 31, 46, 47 and 48 are successively executed. Since S3=0, the step 50 is executed to raise the tone arm.

A step 54 is provided to follow the step 50 or 52 to introduce a delay period to disable the operation of key BC if it continues after tone arm 22 has been raised or lowered. Control returns to step 30 immediately following the delay period.

When either of the keys BR, BL and BC is operated, steps 30, 31, 46 and 47 are repeatedly executed through a "no" decision route from step 47 to step 30 to maintain the tone arm under de-energized condition.

What is claimed is:

1. A tone arm control system comprising:
   first and second manually operated keys;
   vertical moving means including means for moving said tone arm to an upward position in response to operation of either of said first and second keys;
   horizontal moving means including means for moving said tone arm in a specified horizontal direction in response to operation of a specific one of said first and second keys after said tone arm is moved to the upward position,
   said horizontal moving means further including means for moving said tone arm at a first low speed for a predetermined interval after the movement to the upward position, and at a second higher speed subsequent to said predetermined interval.

2. A tone arm control system as claimed in claim 1 wherein said vertical and horizontal moving means comprise a vertical drive motor for moving the tone arm in vertical directions, a horizontal drive motor for moving the tone arm in horizontal directions, and a control circuit which includes:
- means for detecting which one of said first and second keys is operated;
- means for energizing said vertical drive motor in response to said detecting means to move said tone arm to the upward position;
- means for energizing said horizontal drive motor to move said tone arm after said vertical drive motor is energized at said first low speed in a horizontal direction which depends on which one of said keys is detected;
- means for counting clock pulses in response to the tone arm being started moving in said horizontal direction;
- means for increasing the speed of the horizontally moving tone arm to said second higher speed when the number of counted clock pulses is greater than a predetermined value; and
- means for de-energizing said horizontal drive motor when said operated key is restored to an inoperative state.

3. A tone arm control system comprising:
first and second manually operated keys;
vertical moving means including: a vertical drive motor for moving the tone arm in vertical directions; and means for moving said tone arm to an upward position in response to the operation of either of said keys;
horizontal moving means including: a horizontal drive motor for moving the tone arm in horizontal directions; and means for moving said tone arm in a specified horizontal direction according to the specific operated key, at a first low speed for a predetermined interval and subsequently at a second higher speed; and
a control circuit which includes:
- means for detecting which one of said first and second keys is operated;
- means for energizing said vertical drive motor in response to said means for detecting to move said tone arm to the upward position;
- means for energizing said horizontal drive motor to move said tone arm at said first low speed in a horizontal direction depending on which one of said keys is detected by said means for detecting;
- said means for energizing said horizontal drive motor operating after said tone arm is moved to the upward position;
- means for counting clock pulses in response to the start of horizontal movement of said tone arm;
- means for increasing the speed of the horizontally moving tone arm to said second higher speed when the number of counted clock pulses exceeds a predetermined number; and
- means for deenergizing said horizontal drive motor when said operated key is restored to an inoperative state.

4. A tone arm control system as claimed in claim 1 or 3, further comprising a third manually operated key wherein said vertical moving means is responsive to operation of said third key to move said tone arm to the upward position and responsive to subsequent operation of said third key to move said tone arm to a downward position.

5. A tone arm control system as claimed in claim 4, wherein said vertical moving means comprises means for sensing whether said tone arm is in a downward or upward position at the moment said third key is operated, and means for moving said tone arm to a position opposite to the position sensed at said moment.

6. A tone arm control system comprising:
first and second manually operated keys;
a vertical drive motor for moving the tone arm between downward and upward positions;
a horizontal drive motor for moving the tone arm in one of opposing horizontal direction;
first and second switching means;
a variable loss attenuator having an input terminal connected selectively to first and second polarity voltage sources through said first switching means and an output terminal connected to said horizontal drive motor, and a microcomputer which is programmed to perform the following steps:
- detecting which one of said first and second keys is operated;
- controlling said second switching means to connect said first polarity voltage source to said vertical drive motor to move said tone arm to the upward position;
- controlling said attenuator to have a relatively high value of attenuation to set the speed of horizontal movement of the tone arm at a relatively low value;
- if said first key is detected as being operated, controlling said first switching means to connect said first polarity voltage source to said attenuator to move said tone arm in a first horizontal direction at said relatively low speed;
- if said second key is detected as being operated, controlling said first switching means to connect said second polarity voltage source to said attenuator to move said tone arm in a second horizontal direction at said relatively low speed;
- counting clock pulses as long as the operated key remains in the operative state;
- detecting when said counted clock pulses reach a predetermined number;
- if said predetermined number is reached, controlling said attenuator to have a relatively low value of attenuation to increase the speed of said tone arm;
- detecting when said operated key is restored to an inoperative state; and
- controlling said attenuator to increase its attenuation to infinity to stop the tone arm horizontal movement.

7. A tone arm control system as claimed in claim 6, further comprising a third manually operated key, and wherein said microcomputer is further programmed to perform the following steps:
- detecting when said third key is operated;
- controlling said attenuator to increase its attenuation to infinity to de-energize said horizontal drive motor;
- detecting the logical level of a control signal applied to said second switching means;
- reversing the logical level of said control signal to move said tone arm to a vertical position opposite to the position in which the tone arm is located at the moment said logical level is detected; and
- introducing a delay period following the reversal of said logical level.

8. A tone arm control system comprising:
first, second and third manually operated keys;
vertical drive means for moving the tone arm between downward and upward positions;

horizontal drive means for moving the tone arm in one of opposite horizontal directions;

first means responsive to operation of either of said first and second keys for causing said vertical drive means to move said tone arm to the upward position and for subsequently causing said horizontal drive means to move said tone arm at a set speed in one of said horizontal directions depending on which one of said first and second keys is operated;

second means for counting the time during which said first or second key remains operated;

third means responsive to operation of either of said first and second keys for setting the horizontal speed of said tone arm at a low value and for subsequently resetting the horizontal speed to a high value when said counted time reaches a predetermined value; and fourth means responsive to operation of said third key for causing said vertical drive means to move said tone arm to said downward position.

9. A tone arm control system as claimed in claim 8, wherein said fourth means comprises means for causing said vertical drive means to move said tone arm in a direction toward said upward or downward position depending on the vertical position of said tone arm at the moment said third key is operated.

10. A tone arm control system comprising:
first, second and third manually operated keys;
a vertical drive motor for moving the tone arm between downward and upward positions;
a horizontal drive motor for moving the tone arm in one of opposite horizontal directions;
first and second switching means;
a variable loss attenuator having an input terminal connected selectively to first and second polarity voltage sources through said first switching means and an output terminal connected to said horizontal drive motor;
a microcomputer which is programmed to perform the following steps:
detecting which one of said first and second keys is operated;
controlling said second switching means to connect said first polarity voltage source to said vertical drive motor to move said tone arm to the upward position;
controlling said attenuator to have a relatively high value of attenuation to set the speed of horizontal movement of the tone arm at a relatively low value;
if said first key is detected as being operated, controlling said first switching means to connect said first polarity voltage source to said attenuator to move said tone arm in a first horizontal direction at said relatively low speed;
if said second key is detected as being operated, controlling said first switching means to connect said second polarity voltage source to said attenuator to move said tone arm in a second horizontal direction at said relatively low speed;
counting clock pulses as long as the operated key remains in the operative state;
detecting when said counted clock pulses reach a predetermined number;
if said predetermined number is reached, controlling said attenuator to have a relatively low value of attenuation to increase the speed of said tone arm;
detecting when said operated key is restored to an inoperative state;
controlling said attenuator to increase its attenuation to infinity to stop the horizontal movement of the tone arm;
detecting when said third key is operated;
controlling said attenuator to increase its attenuation to infinity to de-energize said horizontal drive motor;
detecting the logical level of a control signal applied to said second switching means; and
reversing the logical level of said control signal to move said tone arm to a vertical position opposite to the position in which the tone arm is located at the moment said logical level is detected.

11. A tone arm control system as claimed in claim 10, wherein said microcomputer is further programmed to perform the step of introducing a delay period following the reversal of said logical level.

* * * * *